United States Patent
Segarra

(10) Patent No.: US 6,724,598 B2
(45) Date of Patent: Apr. 20, 2004

(54) SOLID STATE SWITCH WITH TEMPERATURE COMPENSATED CURRENT LIMIT

(76) Inventor: Daniel Segarra, 1028 Curve St., Carlisle, MA (US) 01741

( * ) Notice: Subject to any disclaimer, the term of this patent is extended or adjusted under 35 U.S.C. 154(b) by 0 days.

(21) Appl. No.: 09/977,136

(22) Filed: Oct. 12, 2001

(65) Prior Publication Data

US 2003/0072119 A1 Apr. 17, 2003

(51) Int. Cl.[7] .............. H02H 3/08; H02H 5/04
(52) U.S. Cl. ...................................... 361/93.8
(58) Field of Search .............. 361/93.8, 18, 91, 361/86, 91.2

(56) References Cited

U.S. PATENT DOCUMENTS

| | | | | |
|---|---|---|---|---|
| 3,796,943 A | * | 3/1974 | Nelson et al. ............... 323/9 |
| 4,384,217 A | * | 5/1983 | Tsividis ..................... 307/297 |
| 4,660,121 A | * | 4/1987 | Kapfer et al. ................ 361/58 |
| 4,914,357 A | * | 4/1990 | Valley ....................... 315/309 |
| 5,469,002 A | * | 11/1995 | Garrett ...................... 307/150 |
| 5,501,517 A | * | 3/1996 | Kiuchi ....................... 361/101 |
| 5,804,956 A | | 9/1998 | Pulvirenti ................... 323/277 |
| 6,055,149 A | * | 4/2000 | Gillberg et al. .............. 361/103 |
| 6,275,395 B1 | * | 8/2001 | Inn et al. .................... 363/60 |
| 6,356,423 B1 | * | 3/2002 | Hastings et al. ............ 361/93.2 |
| 6,504,422 B1 | * | 1/2003 | Rader et al. ................ 327/536 |

* cited by examiner

Primary Examiner—Brian Sircus
Assistant Examiner—Z Kitov
(74) Attorney, Agent, or Firm—Fliesler Meyer LLP

(57) ABSTRACT

The present invention relates to a circuit and method of providing a voltage having a temperature independent current compliance to a load. The circuit includes a first resistive element having a temperature dependent resistivity, a second resistive element, an amplifier, a current module generating a temperature dependent current, and a load current controller. Temperature dependent voltages developed across the resistive elements track each other to enable a constant current limit over a wide temperature range.

16 Claims, 4 Drawing Sheets

SOLID STATE SWITCH WITH TEMPERATURE COMPENSATED CURRENT LIMIT

FIELD OF THE INVENTION

The invention relates to a current limit circuit and more specifically to a temperature compensated current limit circuit implemented in a solid state switch.

BACKGROUND OF THE INVENTION

Voltage regulation integrated circuits provide a regulated output voltage to a load. These circuits often include a current limitation feature that prevents current in excess of a predefined limit from flowing in the integrated circuit if the load increases to an unacceptable level. Another class of circuits that rely on accurate current limit protection are solid state switch circuits. These circuits provide a low impedance connection between two nodes and limit current to less than a predetermined value. Without compensating for temperature variations, a shift in the current limit value can occur. For example, the current limit value can shift by more than forty percent over a range of −40° C. to +85° C. due to temperature dependent electrical characteristics of the materials used in the circuit components. Thus, the current limiting portion of the circuit may not provide adequate protection in certain applications. What is needed is a circuit that provides a stable current limit over a wide temperature range.

SUMMARY OF THE INVENTION

The present invention relates to a circuit and a method of stabilizing the current limit over a range of temperatures. The present invention is directed to limiting the amount of current flow through a metal interconnect, thus providing temperature current limit protection.

One aspect of the invention relates to a temperature compensated current limit circuit used in a solid state switch. The circuit, under normal operating conditions, fully enhances an integrated MOSFET, resulting in a reduced voltage drop across the switch. When the load current increases to an unacceptable level, the switch limits the current delivered to a load via a servo loop. The current delivered to a load without exhibiting any current limit behavior is often referred to as current compliance.

The circuit includes a first resistive element, a second resistive element, a load current controller, a current module, and an amplifier. The first resistive element has a first terminal adapted to receive an input voltage and has a second terminal. The first resistive element has a temperature dependent resistivity. The second resistive element has a first terminal configured to receive the input voltage and has a second terminal. The load current controller has a first terminal in communication with the second terminal of the first resistive element, a second terminal in communication with a load, and a control terminal adapted to receive a control signal. The amplifier has a first input terminal in communication with the second terminal of the first resistive element, a second input terminal in communication with the second terminal of the second resistive element, and an amplifier output terminal in communication with the control terminal of the load current controller. The amplifier provides the control signal at its output terminal in response to a load current, the resistivity of the first resistive element, the resistivity of the second resistive element, and a temperature dependent current generated by the current module. The current module has a first terminal in communication with the second terminal of the second resistive element and the second terminal of the amplifier. The current module provides a temperature dependent current at its first terminal.

In one embodiment, the load current controller is a current controlling transistor. In another embodiment, the current module generates a current that is proportional to absolute temperature (PTAT). In still another embodiment, the second resistive element includes a primary resistive element, and a secondary resistive element, each having first and second terminals. The first terminal of the primary resistive element is in communication with the first terminal of the second resistive element. The first terminal of the secondary resistive element is in communication with the second terminal of the primary resistive element. The second terminal of the secondary resistive element is in communication with the second terminal of the second resistive element. In a further embodiment, the resistivity of the primary resistive element is greater than the resistivity of the secondary resistive element.

Another aspect of the invention relates to a method of providing a voltage across a load with a temperature independent current compliance. The method includes the steps of generating a first temperature dependent voltage drop in response to the current through the load, generating a second temperature dependent voltage drop in response to a temperature dependent reference current, and amplifying the difference of the first temperature dependent voltage drop and the second temperature dependent voltage drop to generate a control signal. Additionally, the method includes the step of applying the control signal to a load current controller to provide the voltage having a temperature independent current compliance across the load. The method can be applied repeatedly to achieve a continuing current limitation function.

In another aspect, the method includes the steps of comparing a first temperature dependent voltage drop to a second temperature dependent voltage drop, wherein the second temperature dependent voltage drop is responsive to a temperature dependent current, generating a control signal in response to the comparison, and generating the voltage having a temperature independent current compliance in response to the control signal.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
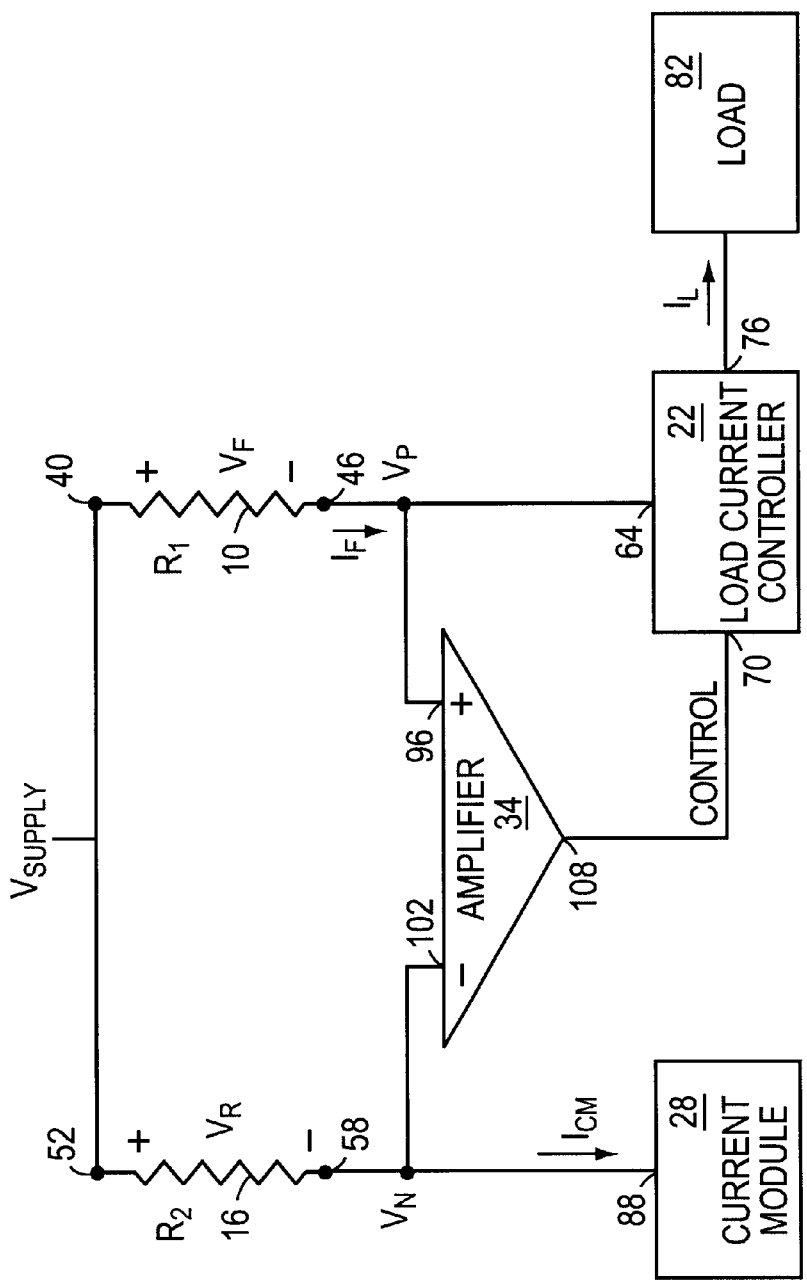
FIG. 1 is a schematic diagram depicting an embodiment of a temperature compensated current limit circuit according to the present invention.

With reference to FIG. 1, in overview, one embodiment of the present of invention includes a first resistive element 10, a second resistive element 16, a load current controller 22, a current module 28, and an amplifier 34. First resistive element 10 includes a first terminal 40 and second terminal 46, and has a temperature dependent resistance ($R_1$). First terminal 40 of the first resistive element 10 is adapted to receive a supply voltage $V_{SUPPLY}$. Second resistive element 16 includes a first terminal 52 and second terminal 58, and has a resistance ($R_2$). First terminal 52 of the second resistive element 16 is adapted to receive supply voltage $V_{SUPPLY}$. In one embodiment, in which the circuit is fabricated as an integrated circuit, the first resistive element 10 is an aluminum interconnect on an integrated circuit providing a nominal resistance (e.g., approximately 25 mΩ) and the second resistive element 16 is a P+ diffusion resistor providing a substantially greater resistance (e.g., approximately 25 kΩ). In such an embodiment, the ratio of resistances of the first resistive element 10 and the second resistive elements 16 is about $1 \times 10^6$.

Load current controller 22 includes a first terminal 64 in communication with the second terminal 46 of the first resistive element 10, a control terminal 70 configured to receive a control signal CONTROL, and an output terminal 76 in communication with a load 82. In one embodiment, load current controller 22 is a Metal-Oxide Semiconductor Field Effect Transistor (MOSFET), and first resistive element 10 is the interconnect of the drain terminal of the MOSFET. Current module 28 includes a terminal 88 in communication with the second terminal 58 of the second resistive element 16. Amplifier 34 includes a first terminal 96 in communication with the second terminal 46 of the first resistive element 10 and the first terminal 64 of load current controller 22, a second input terminal 102 in communication with the second terminal 58 of the second resistive element 16 and terminal 88 of current module 28, and an output terminal 108 in communication with the control terminal 70 of the load current controller 22.

During operation, supply voltage ($V_{SUPPLY}$) is applied to the first terminals 40 and 52 of first and second resistive elements 10 and 16, respectively. A drain current ($I_F$) flows through first resistive element 10. A voltage ($V_F$) which is the product of the temperature dependent resistance ($R_1$) and drain current ($I_F$) exists across the first resistive element 10. Additionally, current module 28 generates a temperature dependent current ($I_{CM}$). In one embodiment, temperature dependent current ($I_{CM}$) is proportional to absolute temperature. Consequently, a reference voltage ($V_R$) which is the product of temperature dependent current ($I_{CM}$) and resistance ($R_2$) is generated across the second resistive element 16. Amplifier 34 amplifies the difference between voltage ($V_P$) (i.e., $V_{SUPPLY} - V_F$) applied to its first terminal 96 and voltage ($V_N$) (i.e., $V_{SUPPLY} - V_R$) applied to its second terminal 102. In response, amplifier 34 generates a control signal CONTROL at its output terminal 108. When voltage ($V_N$) is less than voltage ($V_P$) control signal CONTROL remains at the maximum supply voltage applied to the amplifier. In response, load current controller 22 provides a load current ($I_L$) to load 82 that approximately equals the drain current ($I_F$). As load current ($I_L$) and drain current ($I_F$) increase, the difference between voltages ($V_P$) and ($V_N$) decreases. When drain current $I_F$ reaches a predetermined maximum value, the difference between voltage ($V_P$) and voltage ($V_N$) becomes zero and load current controller 22 provides load current $I_L$ at a predetermined maximum value in response to the modulation of the current controller 22 according to control signal CONTROL.

As the operating temperature varies, the temperature dependent resistance ($R_1$) and temperature dependent current ($I_{CM}$) also vary in such a way as to provide a proper temperature compensated current limit. Resistance ($R_2$) and temperature dependent current ($I_{CM}$) are selected to define the limit voltage ($V_N$) which is compared with voltage ($V_P$) as the temperature varies. In one embodiment, current module 28 is designed such that the temperature dependent current ($I_{CM}$) is generated by a PTAT circuit. For example, the PTAT circuit can be a (ΔVbe)/R circuit which includes a resistor comprised of a material having a temperature dependent resistance similar to a temperature dependent resistance ($R_2$) of the second resistive element 16. Consequently, the temperature dependence of the reference current ($I_{CM}$) generated by the (ΔVbe)/R circuit is designed such that the product of the reference current ($I_{CM}$) and the resistance ($R_2$) of the second resistive element 16 (i.e., voltage $V_R$) directly tracks changes in voltage ($V_F$) due to temperature variations for a fixed load current.

Figure 2:
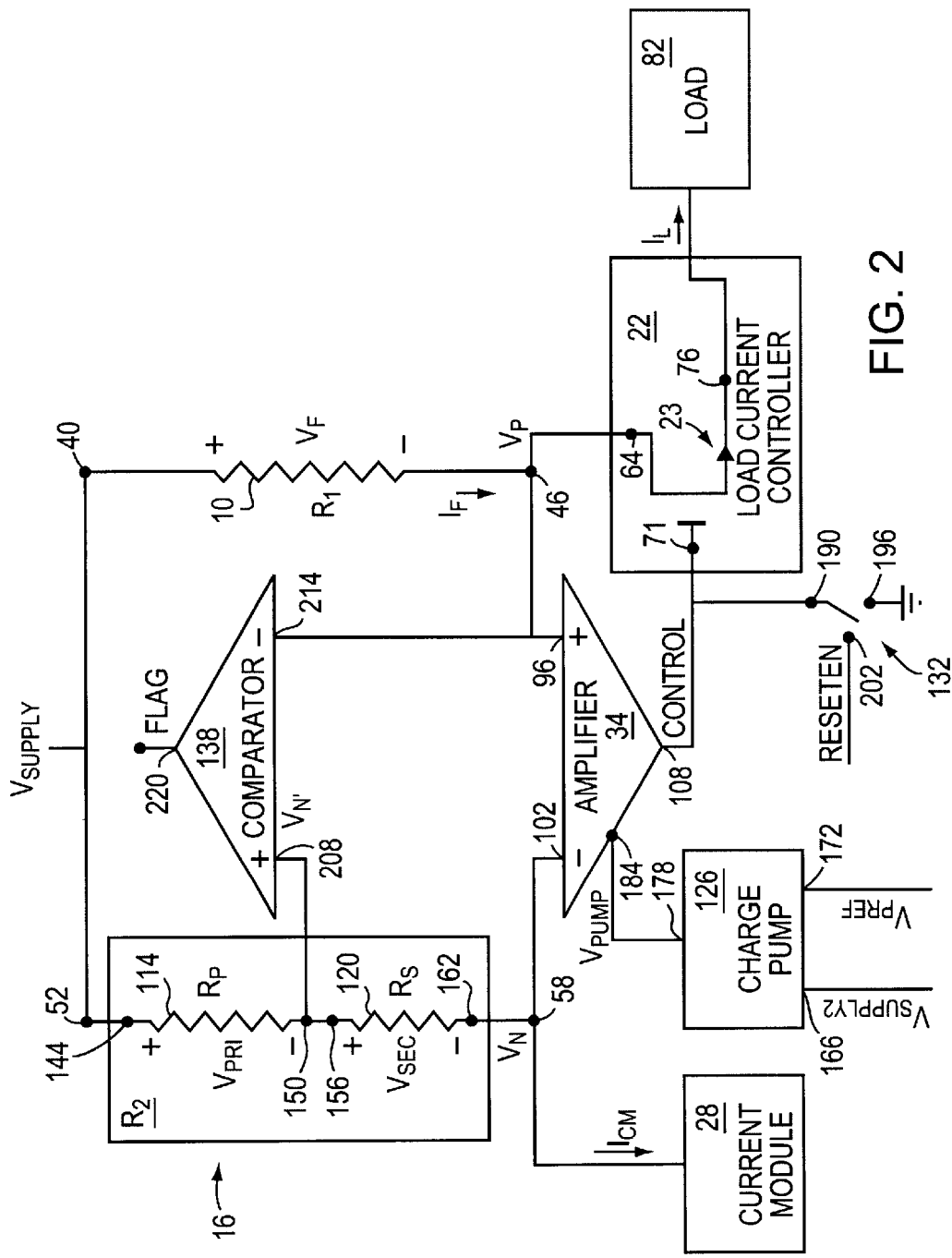
FIG. 2 is a schematic diagram depicting another embodiment of a temperature compensated current limit circuit according to the present invention.

FIG. 2 illustrates an embodiment of the circuit of FIG. 1 in more detail. In this embodiment, current controller 22 is implemented as an N-Channel MOSFET 23. The second resistive element 16 includes a primary resistive element 114 and a secondary resistive element 120. Primary resistive element 114 includes a first terminal 144 which is the first terminal 52 of the second resistive element 16 and a second terminal 150, and has a resistivity $R_P$. Secondary resistive element 120 includes a first terminal 156 connected to the second terminal 150 of primary resistive element 114 and a second terminal 162 which is the second terminal 58 of second resistive element 16, and has a resistivity $R_S$. In one embodiment, the primary resistivity $R_P$ is greater than the secondary resistivity $R_S$. In another embodiment, the primary resistive element 114 and secondary resistive element 120 are both P+ diffusion resistors.

In this embodiment, the circuit also includes a charge pump 126, a reset-switch 132, and a comparator 138. Charge pump 126 includes a first input terminal 166 configured to receive a charge pump supply voltage ($V_{SUPPLY2}$), a second input terminal 172 configured to receive a reference voltage ($V_{PREF}$), and an output terminal 178 connected to a supply terminal 184 of amplifier 34. Reset-switch 132 includes a first terminal 190 connected to the gate 71 of MOSFET 23 of load current controller 22, a second terminal 196 configured to receive a reference voltage (e.g., ground), and a control terminal 202 configured to receive a reset-enable signal (RESETEN). Comparator 138 includes a first input terminal 208 connected to the junction of the second terminal 150 of primary resistive element 114 and the first terminal 156 of the secondary resistive element 120, a second input terminal 214 connected to the second terminal 46 of the first resistive element 10 and to the first input terminal 96 of amplifier 34, and a comparator output terminal 220.

In operation, supply voltage ($V_{SUPPLY}$) is applied to first terminal 144 of primary resistive element 114. Consequently, a voltage drop ($V_{PRI}$) develops across primary resistive element 114 and a voltage $V_{SEC}$ develops across secondary resistive element 120. Comparator 138 generates a flag signal FLAG at output terminal 220 in response to a voltage $V_{N'}$ (equal to $V_{SUPPLY} - V_{PRI}$) existing at common terminals 150, 156 of the primary and secondary resistive elements 114 and 120 respectively. Voltage $V_{N'}$ is slightly greater than voltage $V_N$ because of the additional voltage drop across secondary resistive element 120. As the current $I_F$ through the first resistive element increases towards a maximum allowable limit, voltage $V_P$ decreases. When voltage $V_P$ decreases to less than voltage $V_{N'}$, flag signal FLAG transitions to logic HIGH thereby indicating that current $I_F$ is near or at the predetermined current limit.

Charge pump 126 provides a pump voltage $V_{PUMP}$ at output terminal 178 to amplifier 34. Generally, pump voltage $V_{PUMP}$ is a magnification of the charge pump supply voltage $V_{SUPPLY2}$. In one embodiment, charge pump 126 is a doubler, thereby doubling charge pump supply voltage $V_{SUPPLY2}$. In another embodiment, charge pump supply voltage $V_{SUPPLY2}$ is substantially equal to supply voltage $V_{SUPPLY}$. The higher pump voltage $V_{PUMP}$ allows the amplifier 34 to generate a control signal CONTROL of sufficient magnitude to fully enhance MOSFET 23 to operate in the triode region under normal operating conditions when the load current ($I_L$) is less than the maximum allowable current.

Reset-switch 132 receives reset signal RESETEN at control terminal 202. In response, reset-switch 132 connects or disconnects gate 71 of MOSFET 23 to ground. When gate 71 is coupled to ground, the gate capacitance of the MOSFET 23 is discharged. Consequently, when reset signal RESETEN changes state to activate the circuit, load current $I_L$ gradually increases as the gate capacitance of MOSFET 23 is again charged.

Figure 3:
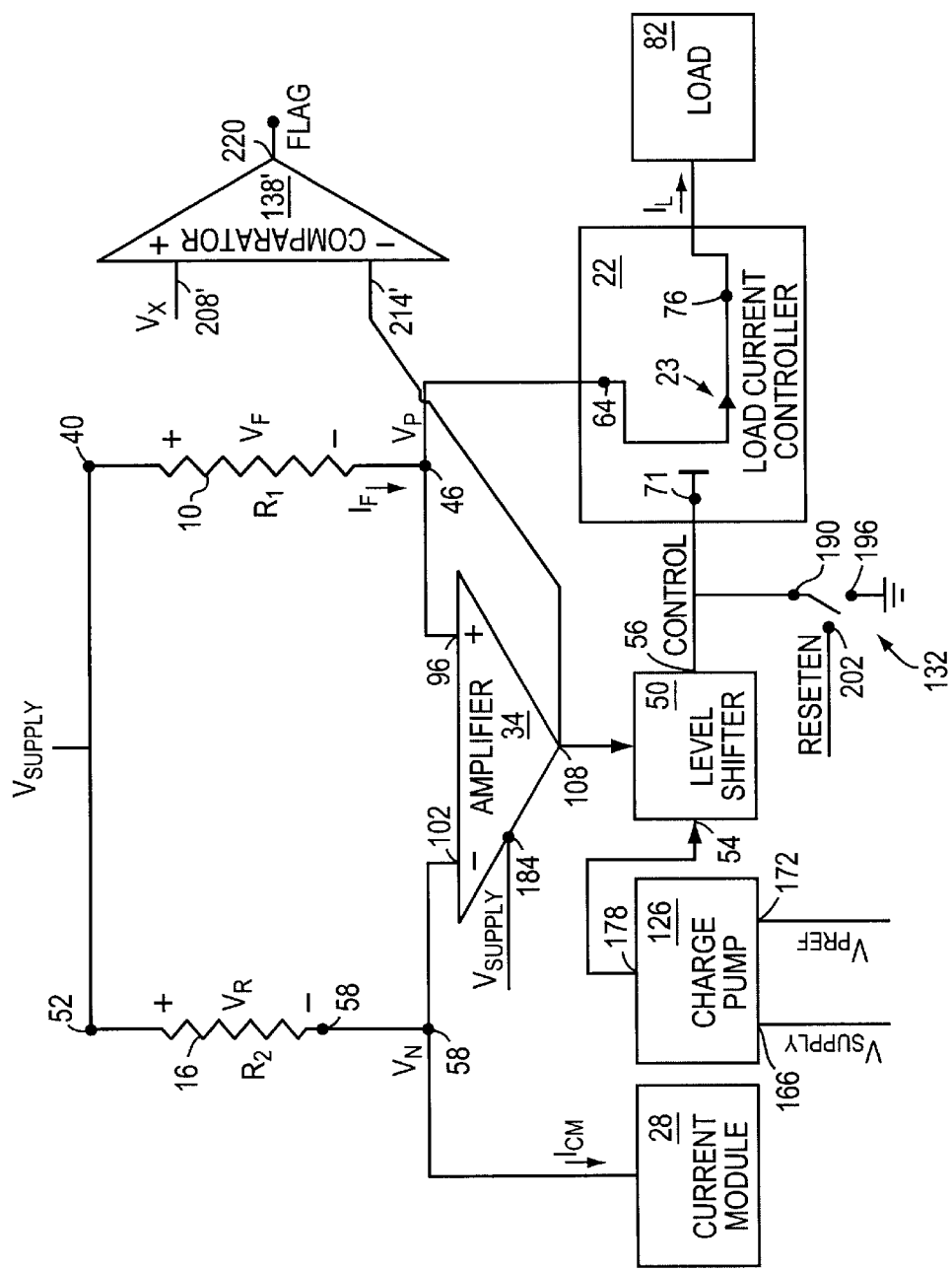
FIG. 3 is a schematic diagram depicting another embodiment of a temperature compensated current limit circuit according to the present invention.

Referring to FIG. 3, an alternative embodiment to the circuit of FIG. 2 includes a level shifter 50 and reconfigured comparator 138'. The charge pump output terminal 178 is connected to input terminal 54 of the level shifter 50. The output terminal 56 of the level shifter 50 is connected to gate 71 of MOSFET 23 in load current controller 22. Comparator 138' has a negative input terminal 214' connected to the output terminal 108 of amplifier 34.

In operation, the level shifter 50 provides the control signal CONTROL to modulate the load current controller 22. The control signal CONTROL is of sufficient magnitude to fully enhance MOSFET 23 to operate in the triode region under operating conditions when the load current ($I_L$) is less than the maximum allowable current. Comparator 138' compares the voltage generated at amplifier terminal 108 and a reference voltage ($V_X$) applied to its positive input terminal 208'. The reference voltage ($V_X$) is selected to correspond to the voltage at terminal 108 of amplifier 34 when the load current $I_L$ is substantially at the maximum allowable current. As current ($I_F$) increases to equal the maximum allowable current, flag signal FLAG transitions from logic LOW to logic HIGH to indicate that the circuit is operating at the current limit.

Figure 4:
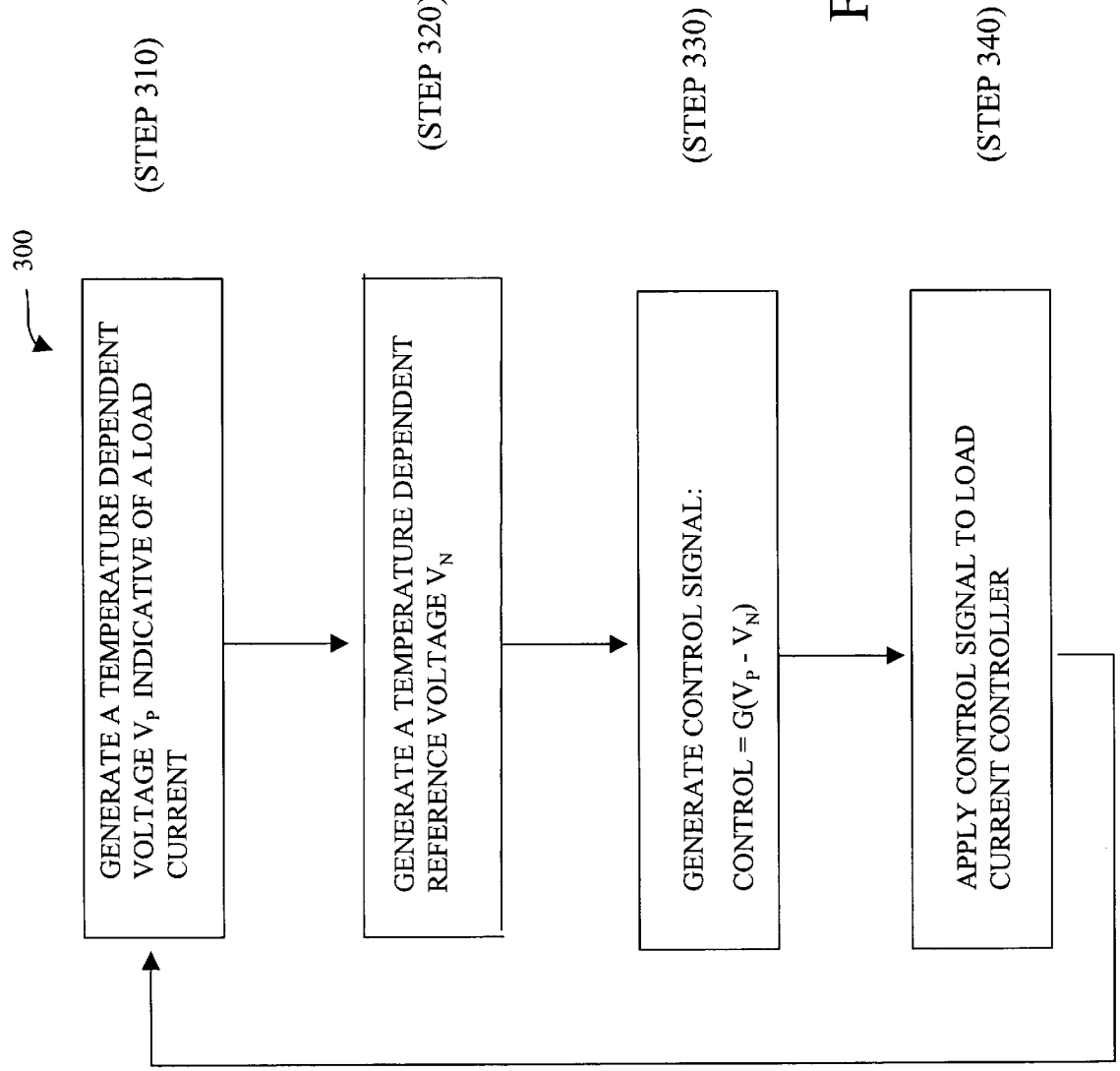
FIG. 4 is a flow chart representation of an embodiment of a method for providing a voltage across a load according to the present invention.

With reference to FIG. 4, one embodiment of the present invention relates to a method 300 for providing a voltage across a load in which the voltage has a temperature independent current compliance. In step 310 a first temperature dependent voltage ($V_P$) indicative of a load current is generated. For example, the voltage ($V_P$) can be generated by conducting the load current through a know resistance. In step 320, a temperature dependent reference voltage ($V_N$) is generated. A control signal CONTROL is generated (step 330) by amplifying the difference of the temperature dependent voltages ($V_P$) and ($V_N$). The control signal CONTROL is applied (step 340) to a load controller. The load controller provides a current having a temperature independent current compliance to the load. The steps of the method 300 are preferably directed to a feedback loop therefore, after completing step 340, the method returns to step 310 to again perform steps 310 through 340.

The invention may be embodied in other specific forms without departing from the spirit or essential characteristics thereof. For example, all polarities of logic and voltage signals are shown to represent such polarities in a single functional embodiment. One skilled in the art can easily choose different polarities and arrange the specific components and logic accordingly. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A temperature compensated current limit circuit comprising:
   a first resistive element having a first terminal and a second terminal, said first terminal adapted to receive an input voltage, said first resistive element having a temperature dependent resistivity;
   a second resistive element having a first terminal and a second terminal, said first terminal adapted to receive said input voltage;
   a load current controller having a first terminal in communication with said second terminal of said first resistive element, a second terminal in communication with a load, and a control terminal adapted to receive a control signal;
   a current module having a first terminal in communication with said second terminal of said second resistive element, said current module providing a temperature dependent current at said first terminal; and
   an amplifier having a first input terminal in communication with said second terminal of said first resistive element, a second input terminal in communication with said second terminal of said second resistive element, and an amplifier output terminal in communication with said control terminal of said load current controller, said amplifier providing said control signal at said amplifier output terminal in response to a load current, said resistivity of said first resistive element, said resistivity of said second resistive element and said temperature dependent current.

2. The circuit of claim 1 wherein said load current controller is a current controlling transistor.

3. The circuit of claim 1 wherein said current module generates an output current proportional to absolute temperature.

4. The circuit of claim 1 wherein said second resistive element comprises a primary resistive element and a secondary resistive element, said primary resistive element having a first terminal which is said first terminal of said second resistive element and having a second terminal, said secondary resistive element having a first terminal in communication with second terminal of said primary resistive element and having a second terminal which is said second terminal of said second resistive element.

5. The circuit of claim 4 wherein said resistivity of said primary resistive element is greater than said resistivity of said secondary resistive element.

6. The circuit of claim 4 further comprising a comparator having a first comparator terminal in communication with said second terminal of said first resistive element, a second comparator terminal in communication with said second terminal of said primary resistive element and a comparator output terminal, said comparator generating a flag signal at said comparator output terminal in response to a voltage across said first resistive element and a voltage across said primary resistive element.

7. The circuit of claim 4 wherein each of said first resistive element, said primary resistive element, and said secondary resistive element is a resistor.

8. The circuit of claim 1 wherein said first resistive element comprises a metal interconnect in an integrated circuit.

9. The circuit of claim 8 wherein said metal interconnect comprises an aluminum material.

10. The circuit of claim 1 wherein said amplifier has a third input terminal, the circuit further comprising a charge pump having a first pump terminal adapted to receive a first reference voltage, a second pump terminal adapted to receive a supply voltage, and a pump output terminal in communication with said third input terminal of said amplifier, said charge pump providing a magnified voltage at said pump output terminal in response to said supply voltage.

11. The circuit of claim 10 wherein said supply voltage is substantially equal to said input voltage.

12. The circuit of claim 1 further comprising a reset-switch having a first terminal in communication with said control terminal of said load current controller, a second terminal adapted to receive a second reference voltage, and a control terminal adapted to receive an enable signal, said reset-switch applying said second reference voltage to said control terminal of said load current controller in response to said enable signal.

13. The circuit of claim 12 wherein said reset-switch is a transistor.

14. A method for providing a voltage across a load, said voltage having a temperature independent current compliance, comprising:
   generating a first temperature dependent voltage in response to a current through said load;
   generating a second temperature dependent voltage drop in response to a temperature dependent reference current;
   applying said first temperature dependent voltage to both an amplifier and a load current controller;
   amplifying the difference of said first temperature dependant voltage and said second temperature dependent voltage to generate a control signal; and
   applying said control signal to said load current controller to provide said voltage having a temperature independent current compliance across said load.

15. A method for providing a voltage across a load, said voltage having a temperature independent current compliance, comprising:
   applying a first temperature dependent voltage to both an amplifier and a load current controller;
   comparing said first temperature dependant voltage to a second temperature dependent voltage, wherein said second temperature dependent voltage is responsive to a temperature dependent current;
   generating a control signal in response to said comparison; and
   generating said voltage having a temperature independent current compliance in response to said control signal.

16. A temperature compensated current limit circuit comprising:
   means for determining a difference between a first temperature dependent voltage and a second temperature dependent voltage, said second temperature dependent voltage being responsive to a temperature dependent current;
   means for supplying said first temperature dependent voltage to both a load current controller and said means for determining a difference;
   means for generating a control signal in response to said difference; and
   means for applying a voltage having a temperature independent current compliance across a load in response to said control signal.

* * * * *

UNITED STATES PATENT AND TRADEMARK OFFICE
CERTIFICATE OF CORRECTION

PATENT NO. : 6,724,598 B2
DATED : April 20, 2004
INVENTOR(S) : Daniel Segarra

It is certified that error appears in the above-identified patent and that said Letters Patent is hereby corrected as shown below:

Column 7,
Lines 32-33, delete "voltage drop-in response" and insert therefor -- voltage in response --.

Signed and Sealed this

Twenty-ninth Day of June, 2004

JON W. DUDAS
*Acting Director of the United States Patent and Trademark Office*